Jan. 31, 1967    H. SPERBER ETAL    3,301,310
FUEL SYSTEM
Filed Jan. 14, 1965
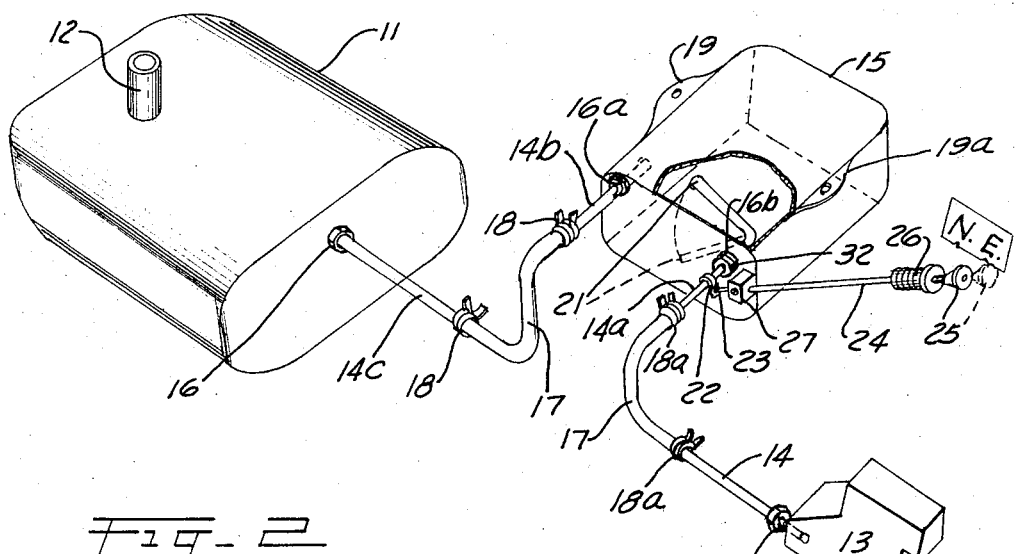
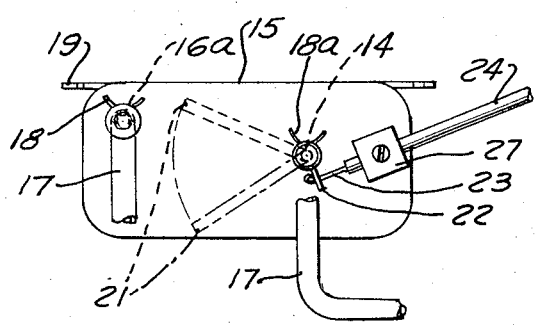
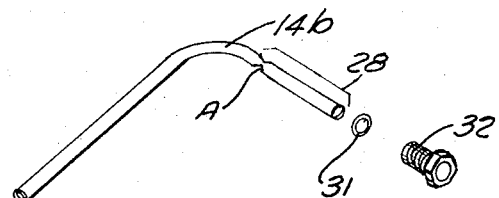
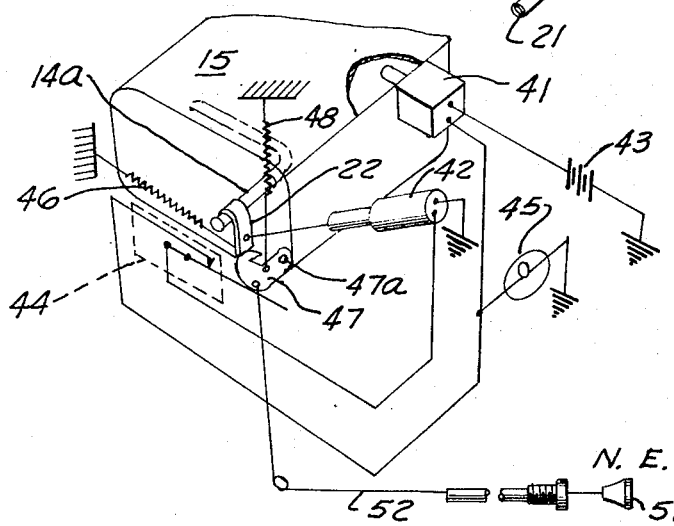
INVENTORS
HENRY SPERBER
DAVID ZAPILER
BY
ATTORNEY

United States Patent Office 3,301,310
Patented Jan. 31, 1967

3,301,310
FUEL SYSTEM
Henry Sperber, 20214 Berg Road, Detroit, Mich. 48219, and David Zapiler, 5734 N. Spaulding, Chicago, Ill. 60645
Filed Jan. 14, 1965, Ser. No. 425,563
3 Claims. (Cl. 158—46.5)

This invention relates generally to fuel systems for internal combustion engines and more particularly concerns a novel emergency reserve fuel arrangement for such systems.

Automobiles have continuously improved in engineering and design features. Nonetheless, a plethora of automobiles run out of gas every day. Not only is this embarrassing to the driver but it can be dangerous to his safety and to the safety of others. For example, the automobile can run out of gas in the middle of a busy intersection or on a busy expressway resulting in a hazardous traffic exigency. Just as serious a situation would prevail if the automobile ran out of gas on a deserted highway, making it necessary for the driver to trudge over lonely, perhaps dangerous roads to the nearest source of fuel.

Automobiles run out of gas, among other reasons, because of inefficient or inoperative gas gauges. Regardless of why they run out of gas the most prevalent present solution is the hike to a source of fuel supply; after having the automobile pushed away from blocking the flow of traffic.

Another known solution is to carry an extra fuel container. Here again, the stalled automobile must be manually removed from blocking traffic. The driver must go outside the car in what may be inclement weather and place in the fuel from the container into the gas tank of the stalled automobile.

The primary object of this invention is to provide an emergency fuel tank arrangement for internal combustion engines which will effectively minimize the hazard and inconvenience of running out of gas.

A related object of this invention is to provide a reserve emergency gas supply containing sufficient fuel to enable the automobile that has consumed all of the fuel in its normal tank to reach a gas station to replenish its fuel supply.

Still another object of this invention is to provide a reserve fuel supply that does not impair the normal flow of fuel from the tank to the carburetor of the internal combustion engine but can readily be inserted as needed.

Yet another object of the invention is to provide a reserve fuel supply that is between the normal fuel tank and tre carburetor. The reserve supply is allowed to flow to the carburetor only when the regular fuel tank is empty.

Another object of the invention is to provide a new and unusual valving arrangement for controlling the flow of fuel from the reserve fuel tank.

And still another object of this invention is to provide a simple manual control for inserting the reserve fuel supply into the fuel system as required.

A related object of this invention is to provide automatic controls for inserting the reserve supply fuel into the fuel lines as required.

Another object of the invention is to provide a reserve fuel arrangement that can readily be installed in existing vehicles.

In accordance with one embodiment of this invention a reserve fuel tank is provided that holds a nominal supply of fuel. The supply should be sufficient to enable the transporting vehicle to reach a gas station. The reserve tank is placed in the fuel line between the regular gas tank and the fuel pump. An intake tube connects the regular tank to the reserve tank. The outlet tube couples the reserve tank to the fuel pump. The outlet tube is provided with an outlet orifice normally positioned at the top of the tank. The outlet orifice can be moved to a position at the bottom of the reserve tank. Thus, normally the fuel is drawn from the regular tank through the top of the reserve tank to the fuel pump. When the regular tank is empty, causing air to be drawn from the top of the reserve tank which would cause the engine to stall, the outlet orifice is moved to the emergency position, at the bottom of the tank. In this manner, the fuel in the reserve tank is added to the fuel system to enable the automobile to continue in its travels and replenish the fuel supply without any inconvenience or hazard to the operator of the vehicle.

The above mentioned and other features and objects of this invention and the manner of obtaining them will become more apparent and the invention itself will be best understood by reference to the following description of an embodiment of the invention taken in conjunction with the accompanying drawings, wherein:

FIG. 1 shows an embodiment of the inventive fuel system in schematic pictorial form, with its outlet valving arrangement in a normal position;

FIG. 2 shows details of the reserve tank with the valving arrangement in its operated emergency position;

FIG. 3 shows an exploded view of the bent tubing outlet valve; and

FIG. 4 schematically and pictorially shows an arrangement for automatically operating the outlet valve.

Referring now to the drawings, FIG. 1 shows an exemplary fuel system embodying the invention. The system comprises a fuel tank 11, such as is normally found associated with internal combustion engines. The tank is normally but not necessarily strapped to the underside of the vehicle that is propelled by the said internal combustion engine. The tank is filled with fuel through tubing 12 topped by a cap, not shown. When the engine is started the fuel pump schematically shown at 13 creates a vacuum in the fuel line, comprising tubing 14, 14a, 14b, and 14c. The vacuum draws the fuel from the tank, sending it through the fuel pump to the carburetor where it is vaporized for transmittal to the engine.

A reserve tank 15 for emergency use is provided in the system. More specifically, the reserve tank 15 is connected between tubing 14c at the outlet of tank 11 and tubing 14 going into the fuel pump.

The tubing such as tubing 14c, is connected into the component such as tanks, and pumps with well known hydraulic fittings 16, 16a, 16b and 16c to preclude any leakage of the fuel at the coupling points.

If the reserve tank is mounted on the vehicle at the point of manufacture the metallic tubing 14c, 14b is run from the regular tank 11 to the reserve tank 15. On the other hand, if the reserve tank is mounted after the car has been completely manufactured, then the fuel lines 14c and 14b are opened and the reserve tank 15 is connected into the system using a plastic tubing 17 connected respectively between the cut ends of tubing 14c, 14b. It has been found in an exemplary system that 5/16 Tygon tubing works admirably in this function. The coupling between the metallic tubing and the plastic tubing is insured to be leakproof with the use of well known clamps such as hose clamps 18.

The reserve tank is held to vehicle frame or chassis in any known manner. FIG. 1 shows brackets 19, 19a for mounting the reserve tank 15.

Means are provided for switching the fuel of the reserve tank 15 into the system when the main tank 11 is empty. In greater detail, the end of tubing 14a that is within tank 15 is bent at an angle of approximately 90°. In its normal position, as shown in FIG. 1, the orifice 21 at the end of tubing 14 is positioned at the top of the inside of tank 15. Thus, the fuel coming from the main tank 11 is drawn from the top of tank 15 into tubing 14a of the fuel line. Soon after tank 11 is emptied, orifice 21 of tubing 14a protrudes above the fuel in tank 15, since no replenishing fuel is fed to tank 15 through tubing 14b.

Means are provided for moving orifice 21 to be positioned at the bottom of tank 15. In greater details, FIGS. 1 and 2 show a manual control for operating orifice 21 to the bottom of tank 15. For purposes of clarity and continuity the same numerals are used to designate the components of FIGS. 1 and 2.

As shown in FIGS. 1 and 2 a lever 22 is either clamped or brazed to the end of tubing 14a that is coupled into tank 15. Lever 22 is connected to a cable 23, in any well known manner. The cable 23 passes through cable casing 24 and appears at handle 25 which is conveniently mounted, for example on the dashboard, using threaded coupling 26.

The cable has a normal fully inserted position and an emergency pulled out position. The two positions "normal" and "emergency" are indicated by the letters N and E in the block shown above the handle in FIGS. 1 and 2. A mounting block 27 brazed to the tank holds the cable casing juxtaposed to the reserve tank 15. When the handle is in the normal position N, the orifice 21 of tubing 14a is positioned at the top of tank 15. When the handle 25 is pulled out to the emergency E position, the cable 23 exerts a force on lever 22 which causes the tube 14a to rotate in the plastic tubing 17 and at the coupling 16b until the orifice 21 lies at the bottom of reserve tank 15. This position of the system is best seen in FIG. 2.

FIG. 3 shows in an exploded view details of the tubing 14 that is inserted into reserve tank 15. Here again, the same numerical designations are used in FIG. 3 as in FIGS. 1 and 2. Note that the end containing orifice 21 is bent at approximately 90° to the rest of the tubing. The straight section of the tubing 28 is crimped at point A to receive O ring 31 which is made of a material such as "Buna N" rubber. Hydraulic coupling 32 is screwed into a mating coupling 16b mounted in tank 15, tight enough to prevent leakage and loose enough to allow rotation.

It should be noted that a two way valve could be mounted in tank 15 and serve the purposes of bent tubing 14. However, the embodiment shown is less expensive and more reliable.

FIG. 4 shows schematically one means for automatically operating the bent tubing valve already described. Therein is shown a sensing and control device 41 mounted on tank 15. The sensing and control device comprises a sensing device, for example, a diaphragm for detecting variations in pressure for determining when tank 11 is empty. A switch or relay (not shown) in the control device is operated responsive to the determination of an empty tank 11. The switch or relay would thus complete an operating circuit for solenoid 42 extending from ground through battery 43, the control device 41 and microswitch 44.

A circuit is also completed to alarm light 45 that extends from battery through control device 41, light 45 to ground. Thus, both solenoid 42 and alarm light 45 operate responsive to tank 11 being in any empty condition.

Responsive to the operation of solenoid 42 a force is exerted on lever 22 causing tube 14 to rotate until orifice 21 is at the bottom of reserve tank 15. A spring 46 is strained by the movement of lever 22 and tends to return tubing 14 to its normal position.

Tube 14 is maintained in its extended position by the pawl section of lever 22 acting in cooperation with ratchet 47 pivoted around pivot point 47a. Thus, lever 22 when actuated by solenoid 42 pushes ratchet 47, rotating it around fulcrum point 47a. Ratchet 47 is connected to move against the force of the spring 48 to hook lever 22 and hold tubing 14 in its rotated position.

Responsive to the movement of ratchet 47 microswitch 44 opens the operating circuit of switch 44, to prevent excessive battery drain. The operator of the vehicle drives on the reserve supply of gasoline to the nearest gas station to replenish the fuel supply.

When the tanks are refilled, the sensing and control device 41 returns to normal and alarm light 45 turns off. At this time, the operator pulls handle 51 from the normal N position to the refill R position and then returns the handle 51 to the normal N position. Responsive to this operation of the cable handle 51, the ratchet 47 releases lever 22. Tubing 14 returns to its normal position because of the force exerted by spring 46 and ratchet 47 returns to its normal position responsive to the force of spring 48. When ratchet 47 returns to its normal position switch 44 returns to its normally closed position. Thus, the system is again in its normal condition.

When the regular tank 11 of the system of FIG. 1 is emptied, air instead of fuel is drawn through tubing 14b, 17 and 14c into reserve tank 15. The fuel in tank 15 is soon drawn off the top of that tank through bent tubing 14a in its normal position. Immediately thereafter air is drawn through bent tubing 14a to the fuel system causing the motor to cough.

Either responsive to the coughing motor or to an alarm light, connected as shown in FIG. 4, the operator of the vehicle moves cable handle 25 from its normal N position to its emergency E position. Responsive to cable handle 25 in the E position, force is exerted through cable 23 onto lever 22 to rotate bent tubing 14a from its normal position at the top of the tank 15 to its emergency position at the bottom of the tank 15. The fuel supply in tank 15 is now available to the fuel system. The operator of the car proceeds to the nearest gas station. After tank 11 is filled he returns the bent tubing 14a to the normal position by returning handle 25 to its normal position. With bent tubing 14a returned to its normal position, the reserve tank is refilled by gasoline drawn from the regular tank 11 through reserve tank 15 toward the fuel system.

Thus, applicants provide a reliable, economical reserve emergency fuel tank system that is easily installed on new or used cars.

While the principles of the invention have been described above in connection with specific apparatus and applications, it is to be understood that this description is made only by way of example and not as a limitation on the scope of the invention.

We claim:

1. An emergency reserve fuel tank arrangement for internal combustion engine fuel system comprising regular fuel tank means and fuel pump means for drawing the fuel from the regular fuel tank means to the internal combustion engine, said arrangement comprising a reserve fuel tank in the fuel system between said regular tank and said fuel pump, first tubing means connecting said regular tank to said reserve tank to enable fuel to flow from said regular tank means to said reserve tank, second tubing means connecting said reserve tank to said fuel pump, said second tubing means comprising a movable section of tubing inserted into said reserve tank having a normal and an emergency position, said movable section of tubing bent at 90° to the second tubing means at the point of insertion and having its orifice at the top of said reserve tank when said movable section is in the said normal position, control means for rotating said bent tubing to position the orifice at the bottom of said reserve tank when said valve is in said emergency position, said control means comprises lever means attached to said bent tubing, cable means attached to said lever means, solenoid means for actuating said lever to rotate said bent tubing from said normal position to said emergency position, sensing means to sense an empty condition of said regular fuel tank means to energize said solenoid means, and latching means for retaining said bent tubing in said emergency position until manually released.

2. An emergency reserve fuel tank arrangement for internal combustion engine fuel system as claimed in claim 1 wherein said control means comprises lever means attached to said bent tubing outside of said reserve tank, cable means attached to said lever means, handle means for actuating said lever through said cable means to rotate said bent tubing to either said normal position or said emergency position, said bent tubing positioned with the orifice within the tank at the top of the tank when in the normal condition and positioned with the said orifice at the bottom of the tank when in said emergency condition, and O ring means associated with said bent tubing for enabling said bent tubing to rotate without leaking fuel from said reserve tank.

3. The emergency reserve fuel tank arrangement of claim 1 wherein said latching means comprises a pawl and ratchet arrangement, said pawl comprising said lever means.

References Cited by the Examiner
UNITED STATES PATENTS

| | | | |
|---|---|---|---|
| 561,718 | 6/1896 | Martindale | 137—579 X |
| 1,210,988 | 1/1917 | Rosendahl. | |
| 2,818,915 | 1/1958 | Pfeiffer | 158—465 |
| 3,014,474 | 12/1961 | Banker | 158—36 X |
| 3,031,011 | 4/1962 | Dawson et al. | 158—46.5 |
| 3,033,274 | 5/1962 | Webb | 158—46.5 |

FREDERICK KETTERER, *Primary Examiner.*